(12) United States Patent
Ishikawa et al.

(10) Patent No.: US 6,688,279 B2
(45) Date of Patent: Feb. 10, 2004

(54) COMPRESSION-IGNITION INTERNAL COMBUSTION ENGINE

(75) Inventors: Naoya Ishikawa, Fujisawa (JP); Teruo Nakada, Fujisawa (JP); Yutaka Uematsu, Fujisawa (JP); Masato Honda, Fujisawa (JP); Tetsuya Honma, Fujisawa (JP); Jin Yokoyama, Fujisawa (JP); Ryu Hariyoshi, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/266,277

(22) Filed: Oct. 8, 2002

(65) Prior Publication Data

US 2003/0070650 A1 Apr. 17, 2003

(30) Foreign Application Priority Data

Oct. 12, 2001 (JP) ........................ 2001-315289
Nov. 15, 2001 (JP) ........................ 2001-350138

(51) Int. Cl.$^7$ ................................. F02B 3/10
(52) U.S. Cl. .................. 123/299; 123/456; 123/568.11
(58) Field of Search ................... 123/299, 456, 123/568.11

(56) References Cited

U.S. PATENT DOCUMENTS 6,378,487 B1 * 4/2002 Zukouski et al. ........... 123/299
6,467,452 B1 * 10/2002 Duffy et al. ................ 123/299

FOREIGN PATENT DOCUMENTS

| JP | 05-106442 | 4/1993 |
|---|---|---|
| JP | 08-086251 | 4/1996 |
| JP | 2000-220520 | 8/2000 |
| JP | 2000-297645 | 10/2000 |
| JP | 2000-310150 | 11/2000 |
| JP | 2000-352316 | 12/2000 |
| JP | 2000-352344 | 12/2000 |

* cited by examiner

Primary Examiner—Erick Solis
(74) Attorney, Agent, or Firm—McCormick, Paulding & Huber LLP (57) ABSTRACT

A compression-ignition internal combustion engine for conducting pilot injection and main injection beyond the top dead center, wherein pilot injection quantity and timing are optimized. A compression-ignition internal combustion engine, comprising a fuel injection valve for injecting fuel into a combustion chamber in a cylinder, the quantity and timing of the fuel injected through the fuel injection valve being controlled based on engine operating conditions; wherein pilot injection is carried out prior to the top dead center of compression, main injection is then carried out beyond the top dead center of compression, and fuel injection quantity and fuel injection timing of the pilot injection are set such that the maximum rate of heat release induced by the pilot injection is 60 kJ/s or less.

15 Claims, 9 Drawing Sheets

COMPRESSION-IGNITION INTERNAL COMBUSTION ENGINE

CROSS REFERENCES TO RELATED APPLICATIONS

This Application is entitled to the benefit of and incorporates by reference essential subject matter disclosed in Japanese Patent Applications No. 2001-315289 filed Oct. 12, 2001 and No.2001-350138 filed Nov. 15, 2001.

BACKGROUND OF THE INVENTION

1. Field of the Invention

The present invention relates to a compression-ignition internal combustion engine, and more particularly to a compression-ignition internal combustion engine designed to clean exhaust gas by improving combustion features.

2. Description of the Related Art

Demand for environmental compliance concerning internal combustion engines, and more particularly diesel engines, has recently increased, and there is an urgent need to improve exhaust gas. Consequently, although various post-treatment techniques such as diesel particulate filters (DPF) for collecting black smoke and other types of soot, and NOx catalysts for reducing and cleaning NOx are making remarkable progress, methods for improving combustion features as such must still involve drastic measures.

Common diesel combustion is performed using diffusion combustion, which is a combustion mode in which single-stage (one-time) fuel injection is performed near the top dead center of compression (usually about 10° BTDC to 10° ATDC) at which cylinder pressure and temperature has sufficiently increased; the fuel is partially ignited after a specific ignition delay time expires; the fuel is evaporated, mixed with air, and combusted according to diffusion of the fuel; and combustion is conducted while the flames are turbulently diffused in sequence.

However, various improvements have been made concerning the recent increase in demands for reducing smoke and NOx in exhaust gas. Exhaust gas recirculation (EGR) has been known in the past to be effective for reducing NOx, and is now in wide use. However, since EGR entails refluxing the exhaust gas, worsening of the smoke problem cannot be avoided.

In certain cases of regular combustion, cylinder pressure may suddenly increase as a result of rapid initial combustion, and loud combustion noise may occur. In order to prevent this, a two-stage injection process is conducted wherein a pilot injection of a small amount is executed prior to the main injection (primary injection), which is done at regular timing. In this case, after the fuel is ignited by the pilot injection and an ignition source is created, the fuel from the main injection is burned using the ignition source, whereby rapid initial combustion and a rapid increase in cylinder pressure are suppressed, and combustion noise is prevented. The combustion features at this point are substantially identical to diffusion combustion.

However, such regular pilot/main injection is disadvantageous in that the smoke problem is exacerbated when pilot injection is conducted.

Recently, new combustion systems have been proposed in regards to these techniques. One is known as modulated kinetics (MK) combustion, aimed at simultaneously reducing NOx and smoke. This can also be referred to as low-temperature premixed combustion, and the summary thereof is as follows. Specifically, since lowering combustion temperature is effective in reducing NOx, this is done by comparatively massive EGR. There is the concern that smoke will increase if this approach is adopted, but this is dealt with by premixing the fuel. Premixing involves two methods, which are advanced injection wherein fuel is injected earlier than normal, and retarded injection wherein fuel is injected later than normal, but retarded injection is employed because of difficulty with ignition time control in advanced injection. In summary, MK combustion involves the simultaneous reduction of NOx and smoke by combining massive EGR and retarded injection. Reference literature includes "Proceedings of the Automobile Engineering Society," vol. 28, No. 1, 1997-1, p. 41; and Ibid., vol. 28, No. 2, 1997-4, p. 29.

With MK combustion, however, single-stage injection is conducted beyond the top dead center of compression, and ignition and combustion are slowly done after a comparatively long premixing time, so fuel consumption tends to deteriorate, combustion becomes unstable due to low cylinder pressure, and accidental flameouts or white smoke are apt to occur. Since this procedure is based on massive EGR, it is impossible to expect that a significant smoke reduction effect can be obtained.

As shown in Japanese Patent Application Laid-open No. 2000-310150, pilot injection is conducted earlier than normal, and there are devices in which main injection is performed with timing that may cause accidental flameouts without primary injection. This is intended to further reduce NOx.

Although this is effective in reducing NOx, it also results in worsening of smoke because continuous combustion induced by the pilot injection occurs prior to the main injection and smoke is produced as a result of combustion induced by the pilot injection.

Consequently, it is difficult to improve smoke with these techniques, which may not necessarily be sufficient to satisfy strict regulations in the future

SUMMARY OF THE INVENTION

The present invention was therefore devised in view of the above, and an object thereof is to suppress smoke by optimizing the quantity and timing of the pilot injection in a compression-ignition internal combustion engine in which pilot injection is performed and main injection is carried out beyond the top dead center of compression.

Another object of the present invention is to control the instability of combustion in the low-load areas of an engine.

The present invention is a compression-ignition internal combustion engine comprising a fuel injection valve for injecting fuel into a combustion chamber in a cylinder, the fuel injection quantity and the fuel injection timing being controlled based on the engine operating conditions; wherein pilot injection of a comparatively small quantity is carried out through the fuel injection valve prior to the top dead center of compression, and main injection of a comparatively large quantity is then carried out through the fuel injection valve beyond the top dead center of compression; and the fuel injection quantity and fuel injection timing for the pilot injection are set such that the maximum rate of heat release induced by the pilot injection is 60 kJ/s or less.

The timing on the most spark-advanced side of the pilot injection should preferably correspond to the time of a crank angle at which the fuel injected through the fuel injection valve moves past the inlet edge of the cavity formed at the top of the piston.

The EGR performed by an EGR apparatus should preferably be carried out according to the pilot injection and main injection.

The above-mentioned compression-ignition internal combustion engine may be a common-rail diesel engine.

The present invention is a common-rail diesel engine comprising a fuel injection valve for injecting fuel into a combustion chamber in a cylinder, a common rail for constantly supplying high-pressure fuel to the fuel injection valve, and control means for controlling the fuel injection valve such that the quantity and timing of the fuel injected through the fuel injection valve are equivalent to the quantity and timing determined in advance based on the operating conditions of the engine; wherein the control means carries out pilot injection of a comparatively small quantity through the fuel injection valve prior to the top dead center of compression and then carries out main injection of a comparatively large quantity through the fuel injection valve beyond the top dead center of compression, and the pilot injection is carried out based on the fuel injection quantity and fuel injection timing such that the maximum rate of heat release induced by the pilot injection is 60 kJ/s or less.

The present invention is a method for controlling a compression-ignition internal combustion engine configured such that the quantity and timing of the fuel injected through the fuel injection valve into the combustion chamber in the cylinder is controlled based on the operating conditions of the engine; wherein pilot injection of a comparatively small quantity is carried out through the fuel injection valve prior to the top dead center of compression, and main injection of a comparatively large quantity is then carried out through the fuel injection valve beyond the top dead center of compression; and the fuel injection quantity and fuel injection timing in the pilot injection are set such that the maximum rate of heat release induced by the pilot injection is 60 kJ/s or less.

The present invention is a compression-ignition internal combustion engine comprising a fuel injection valve for injecting fuel into a combustion chamber in a cylinder, the quantity and timing of the fuel injected through the fuel injection valve being controlled based on the engine operating conditions; wherein the apparatus comprises as fuel injection control modes a first injection mode in which pilot injection is carried out through the fuel injection valve with a fuel injection quantity and fuel injection timing such that the maximum rate of heat release induced by the pilot injection is 60 kJ/s or less, and main injection is then carried out through the fuel injection valve at a timing beyond the top dead center of compression; and a second injection mode in which pilot injection and main injection are carried out through the fuel injection valve on the basis of conditions that do not fulfill the conditions of the first injection mode; and the fuel injection control modes are switched such that fuel injection control is implemented in the second injection mode in the low-load areas of the engine operating conditions, and fuel injection control is implemented in the first injection mode in the high-load areas of the engine operating conditions.

In this arrangement, regular pilot/main injection is performed instead of low-heat-rate pilot/main injection in a low-load area. Combustion instability in a low-load area can thereby be controlled.

In a low-load area of an engine, the fuel injection control modes are preferably switched such that fuel injection control is implemented in the second injection mode in a low-speed area of the engine and fuel injection control is implemented in the first injection mode in a high-speed area of the engine.

Hysteresis is preferably provided to the switch points of the fuel injection control modes.

Specific smoothing control is preferably implemented when the fuel injection control modes are switched.

In the above-mentioned compression-ignition internal combustion engine mounted in a vehicle, damper control is implemented to prevent coupled vibration of the engine and vehicle when the fuel injection quantity changes rapidly, and when the fuel injection control modes are switched during implementation of the damper control, the fuel injection control modes are preferably switched after a specific time elapses following the start of the damper control.

The EGR performed by a EGR apparatus should preferably be carried out according to the first injection mode.

The above-mentioned compression-ignition internal combustion engine may be a common-rail diesel engine.

The present invention is a common-rail diesel engine comprising a fuel injection valve for injecting fuel into a combustion chamber in a cylinder, a common rail for constantly supplying high-pressure fuel to the fuel injection valve, and control means for controlling the injector such that the quantity and timing of the fuel actually injected through the fuel injection valve are equivalent to the target fuel injection quantity and target fuel injection timing determined in advance based on the operating conditions of the engine; wherein the control means comprises as fuel injection control modes a first injection mode in which pilot injection is carried out through the fuel injection valve with a fuel injection quantity and fuel injection timing such that the maximum rate of heat release induced by the pilot injection is 60 kJ/s or less, and main injection is then carried out through the fuel injection valve at a timing beyond the top dead center of compression; and a second injection mode in which pilot injection and main injection are carried out through the fuel injection valve on the basis of conditions that do not fulfill the conditions of the first injection mode; and the fuel injection control modes are switched such that fuel injection control is implemented in the second injection mode in the low-load areas of the engine, and fuel injection control is implemented in the first injection mode in the high-load areas of the engine.

The present invention is a method for controlling a compression-ignition internal combustion engine configured such that the quantity and timing of the fuel injected through the fuel injection valve into the combustion chamber in the cylinder is controlled based on the operating conditions of the engine; wherein the control method comprises as fuel injection control modes a first injection mode in which pilot injection is carried out through the fuel injection valve with a fuel injection quantity and fuel injection timing such that the maximum rate of heat release induced by the pilot injection is 60 kJ/s or less, and main injection is then carried out through the fuel injection valve at a timing beyond the top dead center of compression; and a second injection mode in which pilot injection and main injection are carried out through the fuel injection valve on the basis of conditions that do not fulfill the conditions of the first injection mode; and the fuel injection control modes are switched such that fuel injection control is implemented in the second injection mode in the low-load areas of the engine, and fuel injection control is implemented in the first injection mode in the high-load areas of the engine.

DESCRIPTION OF THE PREFERRED EMBODIMENTS

The preferred embodiments of the present invention are described below in detail with reference to the accompanying diagrams.

Figure 1:
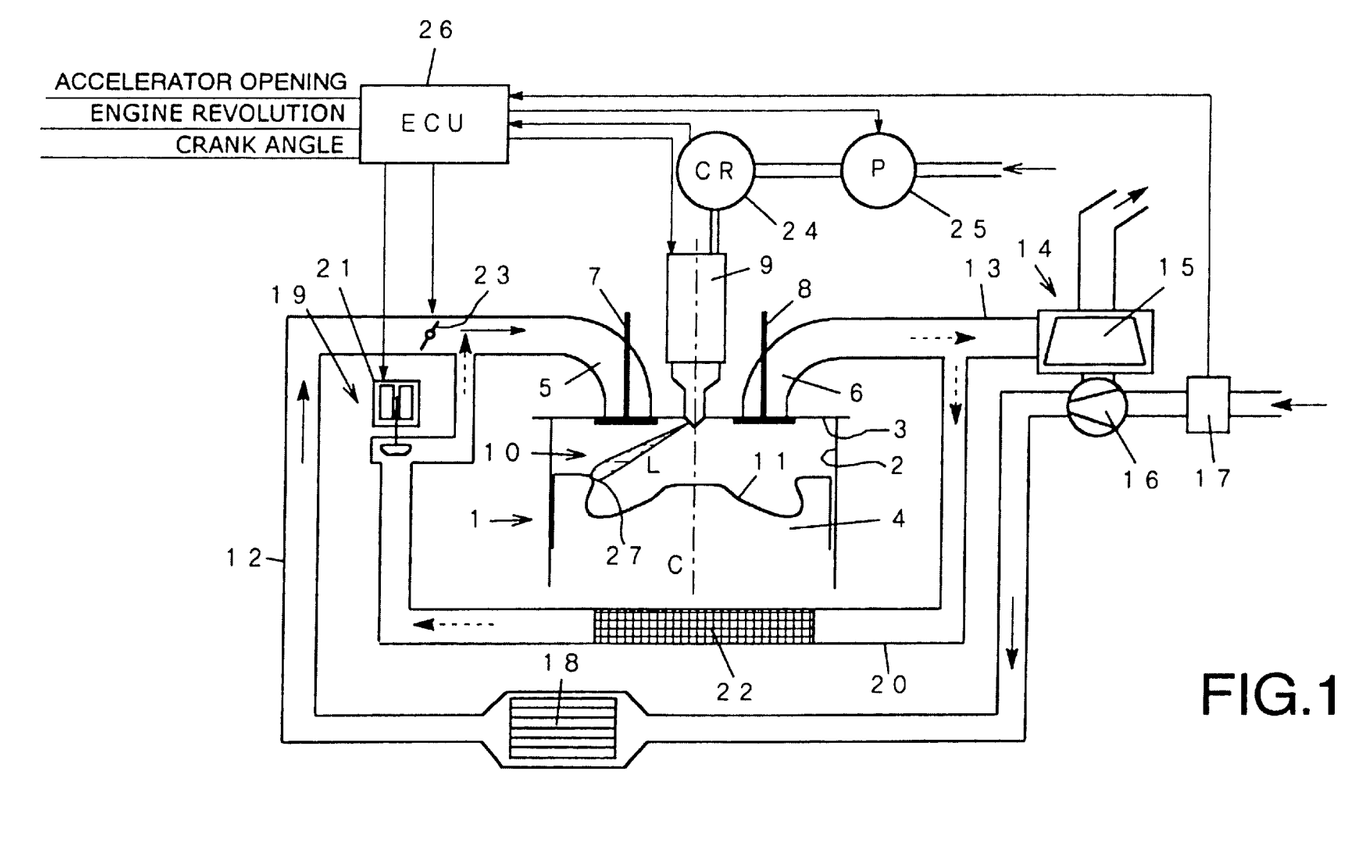
FIG. 1 is a structural diagram depicting a compression-ignition internal combustion engine relating to the embodiments of the present invention.

FIG. 1 depicts a compression-ignition internal combustion engine relating to the present embodiment. The compression-ignition internal combustion engine mentioned here refers to an engine in which the fuel injected into the combustion chamber is spontaneously ignited in the cylinder by the compression in the cylinder, and is typically a diesel engine. In the particular case of the present embodiment, the engine is a common-rail diesel engine comprising a common rail fuel injection apparatus. As a matter of convenience, the diagram shows a single cylinder, but a multi-cylinder is of course also acceptable. This engine is mounted in a vehicle.

1 is an engine body comprising a cylinder 2, a cylinder head 3, a piston 4, an inlet port 5, an exhaust port 6, an inlet valve 7, an exhaust valve 8, an injector 9 which functions as a fuel injection valve, and the like. A fuel chamber 10 is formed inside the cylinder 2, and fuel is injected into the fuel chamber 10 from the injector 9. A cavity 11 is formed at the top of the piston 4, and the cavity 11 forms part of the fuel chamber 10. The bottom center of the cavity 11 protrudes to form a feature of reentrant combustion chamber. The fuel injected through the injector 9 always enters the cavity 11. This is because a unburned HC exhaust and other undesirable phenomena occur when the fuel deposits on the sidewall of the cylinder 2.

The inlet port 5 is connected to an inlet tube 12, and the exhaust port 6 is connected to an exhaust port 13. A turbocharger 14 is also provided to the engine, and exhaust energy is used therein to supercharge the intake. 15 is a turbine, and 16 is a compressor. An intake quantity sensor 17 is provided upstream of the compressor 16 to detect intake quantity, and an inter-cooler 18 is provided downstream of the compressor 16 to cool the intake. It is apparent, however, that the present invention is also effective in a natural intake engine without a turbocharger.

This engine is also equipped with an EGR apparatus 19. The EGR apparatus 19 comprises an EGR cylinder 20 for connecting the inlet tube 12 and exhaust port 13, an EGR valve 21 for regulating EGR quantity, and an EGR cooler 22 for cooling EGR gas upstream of the EGR valve 21. An intake throttle valve 23 is provided in the inlet tube 12 for suitably extracting the intake upstream of the section connected with the EGR cylinder 20.

The injector 9 is connected to a common rail 24, and high-pressure fuel equivalent to the injection pressure (20–200 MPa) collected in the common rail 24 is constantly supplied to the injector 9. Pressurized fuel is supplied as needed to the common rail 24 by a high-pressure pump 25.

An electronic control unit (referred to hereinbelow as ECU) 26 is provided in order to electronically control the engine. The ECU 26 detects the actual engine operating conditions from various types of sensors, and controls a metering valve (not shown) or the like for adjusting the fuel pressure from the injector 9, the EGR valve 21, the intake throttle valve 23, and the high-pressure pump 25 on the basis of the engine operating conditions. In addition to the intake quantity sensor 17, an accelerator opening sensor, an engine revolution sensor, a common rail pressure sensor (none are shown), and the like are included as possible types of sensors, and an arrangement is also provided in which the actual intake quantity, accelerator opening, engine revolution velocity (number of revolutions), engine crank angle, common rail pressure, and the like can be detected by the ECU 26.

The injector 9 has an electromagnetic solenoid that is turned on and off by the ECU 26. The injector opens to inject fuel when the electromagnetic solenoid is on, and closes to cut off fuel injection when the electromagnetic solenoid is off. The ECU 26 determines the target fuel injection quantity and target fuel injection timing primarily from the engine revolution velocity and accelerator opening, and turns the electromagnetic solenoid on for a time corresponding to the target fuel injection quantity simultaneously with the actual fulfillment of this timing. "On" time increases with a greater target fuel injection quantity.

To describe in further detail, the ECU 26 implements the two-stage injection involving pilot injection of a comparatively small quantity and main injection of a comparatively large quantity. Specifically, the target fuel injection timing and target fuel injection quantity based on the engine operating conditions are determined by the ECU 26 both for the pilot injection and for main injection according to a map or the like determined in advance such that the injector 9 is turned on for a time corresponding to the respective target fuel injection quantity, and a pilot injection and main injection appropriate for the respective target fuel injection timing and target fuel injection quantity are performed when the respective target fuel injection timing is achieved.

The ECU 26 determines the target common rail pressure according to the engine operating conditions, and provides feedback control to the common rail pressure such that the actual common rail pressure will approach the target common rail pressure.

The injector 9, placed substantially along the same axis as the cylinder 2, injects fuel in all directions with a plurality of simultaneous injections. The angle formed by the axis line L of the fuel sprays and the cylinder center C is always constant.

Next, the details of fuel injection control in the engine will be described.

The engine or ECU 26 comprises two fuel injection control modes. One is referred to as a low-heat-rate pilot/main injection mode (equivalent to the first injection mode of the present invention), the other is referred to as a regular injection mode (equivalent to the second injection mode of the present invention).

Regular injection mode refers to a mode in which common pilot injection and main injection are carried out and in which the fuel injection timing and fuel injection quantity are normally similar. In fuel injection timing, the main injection is commonly set near the same top dead center of compression (that is, 10° BTDC–10° ATDC), the pilot injection is set at 15–20° BTDC prior to main injection, and the temporal interval (pilot interval) between pilot injection and main injection is comparatively brief. As previously described, this combustion configuration involves ignition and combustion of fuel from the main injection by an ignition source created by the pilot injection, and diffusion combustion is substantially adopted therefor. Rapid initial combustion and a rapid increase in cylinder pressure are prevented by such two-stage injection, and combustion noise is suppressed.

The low-heat-rate pilot/main injection mode will now be described.

The quantity and timing of pilot injection for this mode are controlled such that the maximum rate of heat release induced by the pilot injection is kept at 60 kJ/s or less in order to suppress soot formation. By reducing the maximum rate of heat release induced by the pilot injection, the quantity of soot emitted from the engine can be reduced by controlling the formation of soot induced by the pilot injection without continuous combustion (during the time until the main injection is performed) of the fuel injected into the cylinder by the pilot injection. This combustion (injection) aspect is referred to as low-heat-rate pilot/main combustion (injection), and the fuel combustion control mode in which this combustion (injection) aspect is carried constitutes the low-heat-rate pilot/main injection mode.

Figure 2:
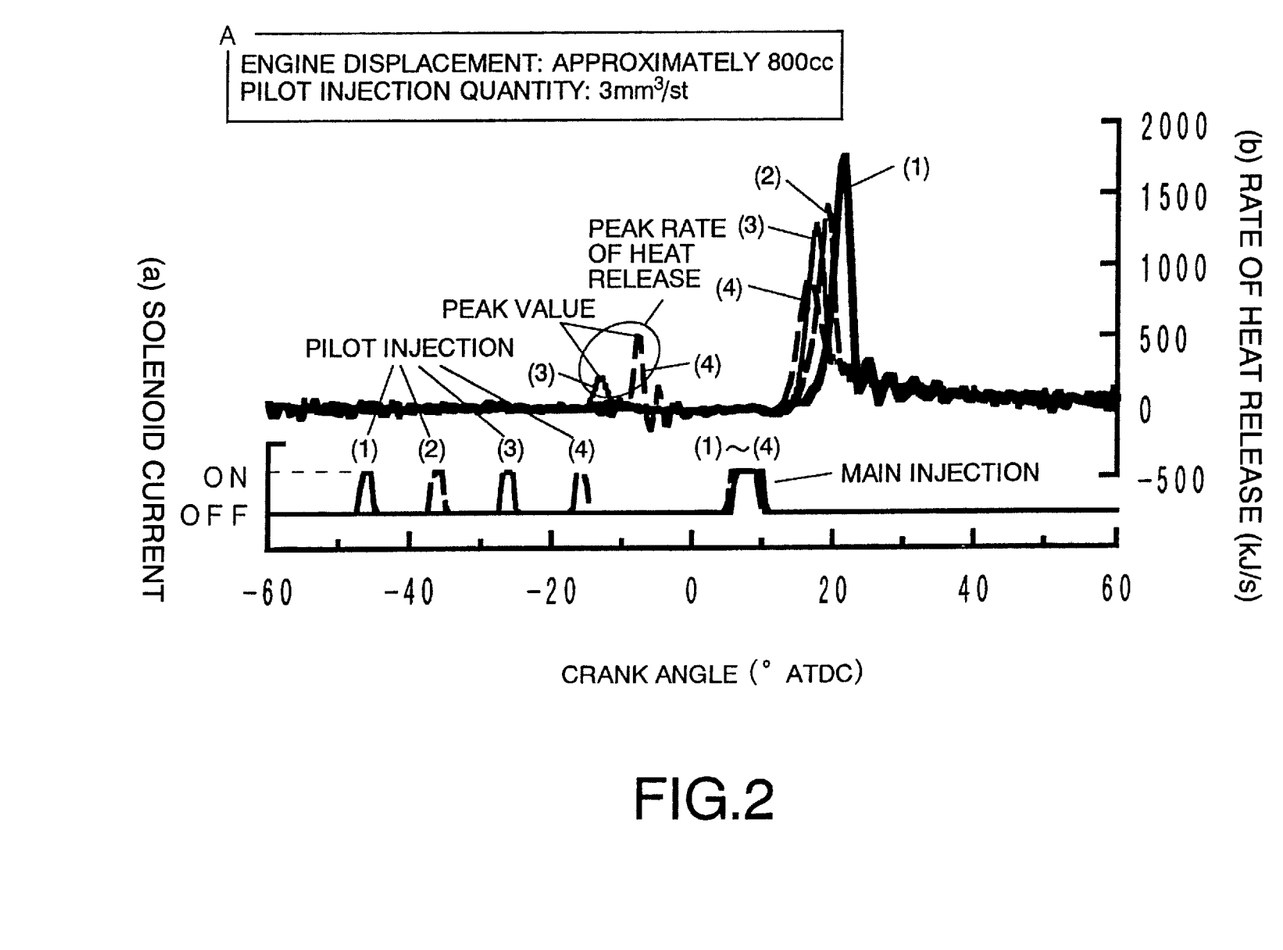
FIG. 2 is a graph depicting the relationship between pilot injection timing and rate of heat release.

FIG. 2 depicts experiment results obtained by examining heat generation conditions in the cylinder under variable pilot injection timing. The crank angle is plotted on the horizontal axis. The lowermost FIG. 2(a) depicts the solenoid current flowing through the electromagnetic solenoid of the injector 9, and FIG. 2(b) depicts the rate of heat release (quantity of heat released per second; kJ/s). The rate of heat release in FIG. 2(b) is the result calculated from the actual measurement of cylinder pressure.

The drawing shows four injection configurations (1)–(4) in which the timing and quantity of main injection and the quantity of pilot injection are kept constant, and the timing of pilot injection alone is varied. The pilot injection timings of (1), (2), (3), and (4) are 48° BTDC (−48° ATDC, same below), 38° BTDC, 28° BTDC, and 18° BTDC, respectively. The main injection timing is 5° ATDC. These timings are all defined by the ON start time of the injector 9.

The general pilot injection timing is set to approach the main injection as much as possible. Because of the limitations of the hardware currently in wide use, the timing is 15–20° BTDC at mid/low-speed revolutions of 2500 rpm or less, so (4) may be regarded as a common pilot injection timing. Correspondingly, pilot injection timing is sequentially accelerated or advanced in the order of (3), (2), (1).

The main injection timing of the present embodiment is set beyond the top dead center TDC of compression, and is set to lag in comparison with general main injection timing under similar operating conditions. Specifically, main retarded injection is carried out. This is intended to facilitate dilution and premixing of fuel in areas of lowered cylinder temperature, and to reduce smoke The rate of heat release resulting from the pilot injection has a distinct peak in the case of (3) and (4), whereas this distinct peak is absent (1) and (2), as shown in FIG. 2(b).

The peak value (maximum value) of the rate of heat release tends to increase with the lagging of the pilot injection timing from (1) to (4). With (3) and (4), fuel (light oil) from the pilot injection undergoes continuous ignition or combustion at peak release times, whereby soot is projected to form. Consequently, the pilot injection timings of (3) and (4) are not particularly advantageous.

Conversely, it is believed that since fuel is injected at lower cylinder pressure and cylinder temperature with earlier pilot injection timing in cases such (1) and (2), sufficient premixing is possible until reaching a cylinder pressure and cylinder temperature at which ignition is possible, and the rate of heat release does not yield a distinct peak, nor does soot form.

From these results, the inventors conducted experiments (see below) concerning the rate of heat release induced by pilot injection, and discovered that there is a strong correlation between the peak rate of heat release induced by pilot injection and soot formation when performed in conjunction with main injection. In view of this, it was decided to optimize the fuel injection quantity and fuel injection timing during pilot injection in the manner described below.

However, the pilot injection fuel has a strong tendency to combust together with the main injection fuel implemented after the top dead center, and the peak value of the rate of heat release tends to increase during combustion of the main injection fuel in (1) and (2) in proportion to the absence of a peak in the rate of heat release when compared with (3) and (4), as shown in the drawing. The peak value of the rate of heat release occurring after the main injection is highest at (1), and decreases successively at (2), (3), and (4). In other words, as the pilot injection is conducted earlier, ignition delay increases and the fuel has a stronger tendency to combust at once together with the main injection fuel.

With such early pilot injection, a high peak value of the rate of heat release (compared with normal pilot injection) can be obtained after the main injection implemented after the top dead center, so combustion is conducted comparatively more rapidly, and it is possible for output to be improved and for fuel consumption to be reduced.

As previously described, it can be concluded that an earlier pilot injection timing is better, but an excessively early timing causes the piston to be positioned rather low, and hence prevents the fuel injected through the injector from entering the cavity any longer. When this happens, fuel deposits on the side wall of the cylinder, oil is diluted, and unburned HC increases, and other problems occur. Consequently, the limit of pilot injection timing on the spark-advance side should preferably correspond to timing in which fuel injected through the injector enters the cavity at the last moment. In other words, this is achieved when the crank angle is such that the fuel L injected through the injector 9 moves past the inlet edge 27 of the cavity 11, as shown in FIG. 1. This crank angle is commonly about 50° BTDC.

The limit for delaying the pilot injection timing and the pilot injection quantity should be appropriately determined with consideration for the correlation between soot and the rate of heat release such as previously described. Specifically, when pilot injection timing is made to lag excessively or when pilot injection quantity is set to an excessively high level, the rate of heat release forms a distinct peak and soot is formed.

Figure 5:
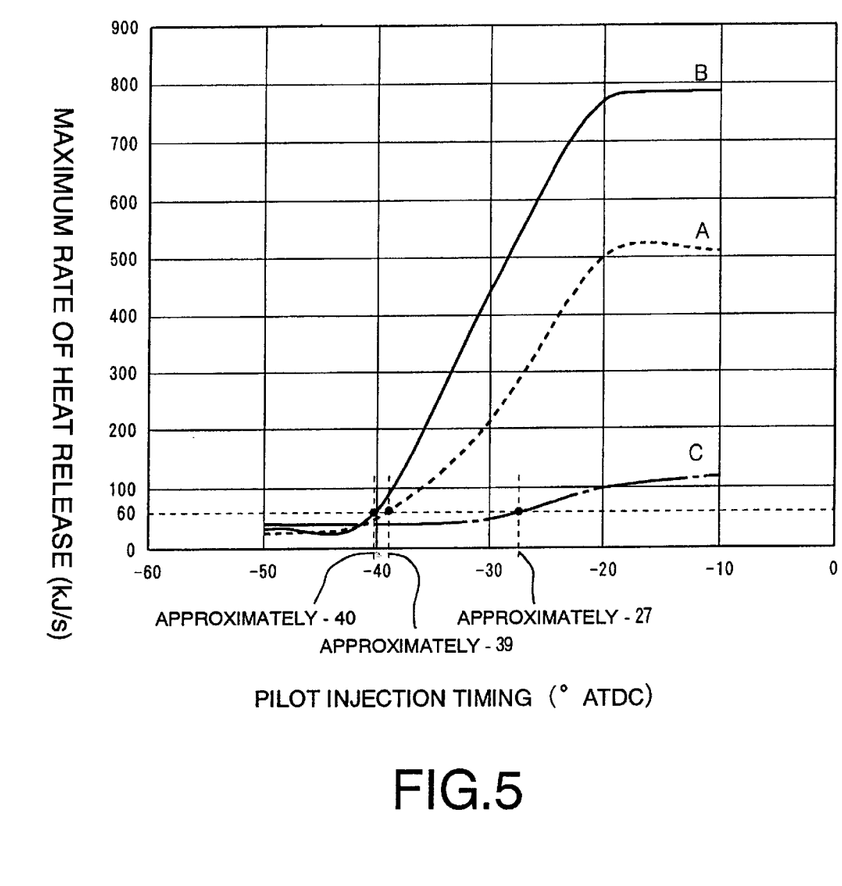
FIG. 5 is a graph depicting the relationship between pilot injection timing and the maximum rate of heat release.
Figure 6:
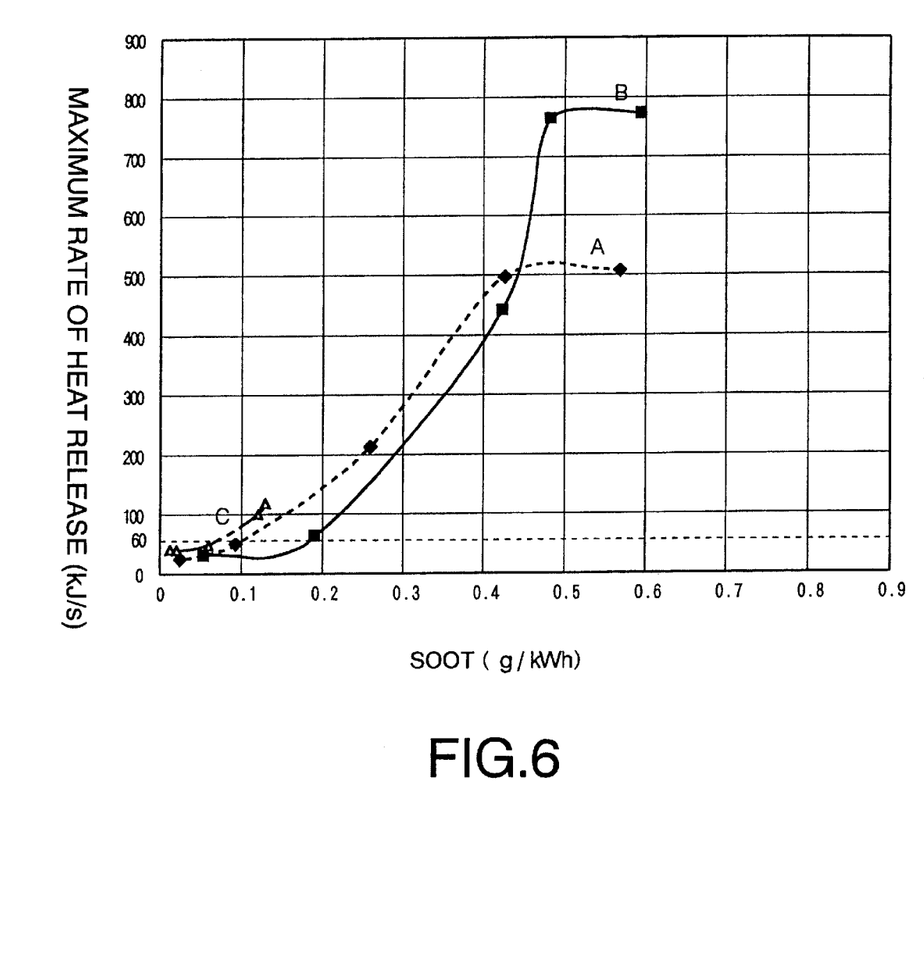
FIG. 6 is a graph depicting the relationship between soot and the maximum rate of heat release.

The results of experiments conducted to determine the above are shown in FIGS. 5 and 6.

FIG. 5 shows the results of examining the relationship between pilot injection timing and the maximum rate of heat release induced by pilot injection. Pilot injection timing (° ATDC) is plotted on the horizontal axis, and the maximum rate of heat release (kJ/s; kilojoules per second) is plotted on the vertical axis. FIG. 6 shows the results of examining the relationship between soot and the maximum rate of heat release induced by pilot injection. Soot (g/kWh) is plotted on the horizontal axis, and the maximum rate of heat release (kJ/s) is plotted on the vertical axis. The maximum rate of heat release mentioned here refers to the peak value (maximum value) of the rate of heat release induced by the pilot injection and occurring prior to the top dead center in the line diagram of the rate of heat release in FIG. 2.

Experiments were conducted concerning two types of pilot injection quantities (A; 3 mm³/st, B; 6 mm³/st) in a multi-cylinder engine with an engine displacement (an exhaust quantity) of approximately 800 cc per cylinder, and one type of pilot injection quantity (C; 1.2 mm³/st) in a multi-cylinder engine with an engine displacement of approximately 400 cc per cylinder. For each of A through C, pilot injection timing was varied between −10 and −50° ATDC to yield the three lines A, B, and C in the graph. As common experimental conditions, the total fuel injection quantity is set such that the engine output torque is constant for the conditions in each of A through C, the total injection quantity is set to a middle load, and the main injection timing is set beyond the top dead center of compression. In this case, the main injection is conducted with a timing which is beyond the top dead center of compression and at which combustion progresses slowly without pilot injection, and also is conducted with a timing and quantity at which ignition does not occur until the main injection is complete. It should be noted that since main injection is conducted prior to the top dead center and near the top dead center, ignition begins instantaneously, and it is impossible to reduce the smoke or NOx.

Figure 3:
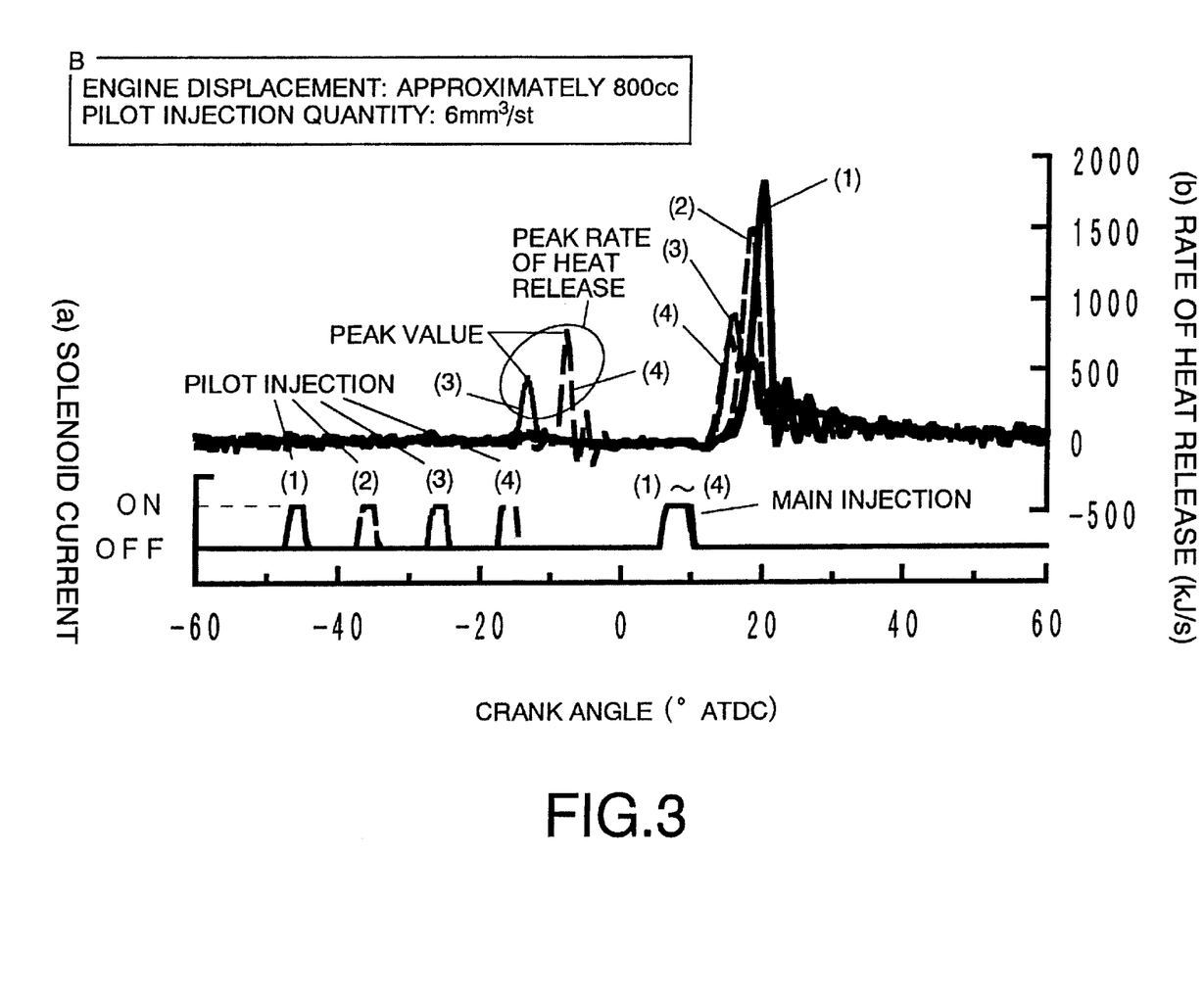
FIG. 3 is a graph depicting the relationship between pilot injection timing and rate of heat release.
Figure 4:
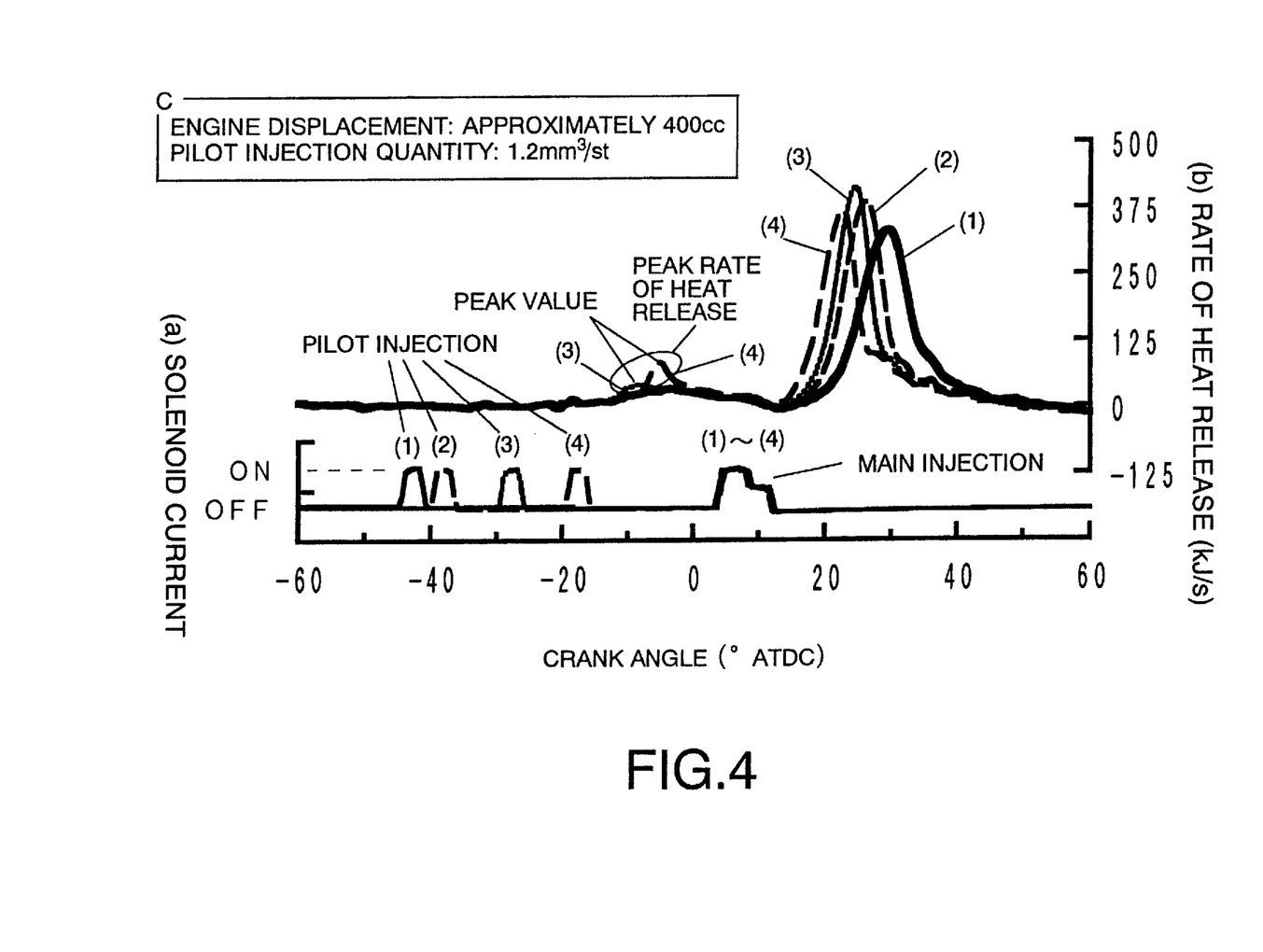
FIG. 4 is a graph depicting the relationship between pilot injection timing and rate of heat release.

Graphs in FIGS. 2, 3, and 4 correspond to A, B, and C, respectively. In other words, the graphs in FIGS. 2, 3, and 4 are made based on the results of experiments conducted under the conditions in A, B, and C, and graphs in FIGS. 5 and 6 are made as well.

As can be seen from FIG. 5, the maximum rate of heat release tends to decrease as the pilot injection timing is advanced. Also, as the pilot injection quantity decreases, there is a tendency for the maximum rate of heat release to decrease as well as for the rate of increase (slope of the line diagram) of the maximum rate of heat release to decrease in relation to the delay of timing.

Next, as the line diagram approaches the left-hand side in FIG. 6, pilot injection timing is advanced, the maximum rate of heat release is reduced, and soot is also reduced. If the maximum rate of heat release is 60 kJ/s or less, a satisfactory soot level can be obtained under any of the conditions in A, B, or C.

From these results, the fuel injection quantity and fuel injection timing for the pilot injection are set to levels at which the maximum rate of heat release in the combustion chamber is 60 kJ/s or less. Pilot injection conducted with such a fuel injection quantity and fuel injection timing is referred to as low-heat-rate pilot injection. In other words, pilot injection quantity and timing at which the maximum rate of heat release reaches 60 kJ/s corresponds to the upper limit of injection quantity and the limit of on the spark-delay side of timing. Combustion of pilot injection fuel alone is thereby prevented, with the result that smoke can be controlled in conjunction with the main injection implemented beyond the top dead center.

Referring back to FIG. 5, the maximum rate of heat release reaches 60 kJ/s prior to approximately −39° ATDC (39° BTDC) under the conditions in A (3 mm³/st), prior to approximately −40° ATDC (40° BTDC) under the conditions in B (6 mm³/st), and prior to approximately −27° ATDC (27° BTDC) under the conditions in C (1.2 mm³/st). In view of this, the pilot injection timings are set to correspond with each of the conditions in A, B, and C.

The combustion (injection) configuration of the present embodiment, in which pilot injection is performed such that the maximum rate of heat release reaches 60 kJ/s, is referred to as low-heat-rate pilot/main combustion (injection), as described above. This combustion configuration can be summarized as follows. First, when pilot injection is conducted with an optimum quantity and optimum timing such as those described above, the injected fuel is sufficiently diffused, diluted, and premixed in the combustion chamber, and continuous ignition and combustion of fuel in the cylinder can be suppressed. These conditions are then sustained until the period in which the top dead center TDC of compression is surpassed and the main injection is combusted. When main injection is carried out in the main injection period (which is set beyond the top dead center), cylinder pressure and temperature decrease below their regular levels, so the main injection fuel is ignited and combusted together with the diluted pre-mixture by the pilot injection after an ignition delay time longer than normal has elapsed. Since premixing of the main injection fuel has already sufficiently advanced at this point, the combustion-induced soot formation is suppressed.

In accordance with low-heat-rate pilot/main injection (also referred to hereinbelow as the "present combustion method"), low-heat-rate pilot injection is performed in addition to retarded main injection, so the premixing time that follows the main injection can be shortened in comparison with the retarded combustion of single-stage injection, and combustion after the main injection can be conducted rapidly at low temperatures in the cylinder. This prevents fuel economy from being adversely affected. Cylinder temperature during the combustion of main injection fuel can also be increased by premixing the pilot injection fuel, and combustion can be stabilized.

In the present combustion method, pilot injection is conducted at optimum quantity and optimum timing as previously described, so the pilot injection fuel is prevented from being combusted prior to main injection, and smoke can be improved in comparison with the technique described in Japanese Patent Application Laid-open No. 2000-310150.

Thus, in a compression-ignition internal combustion engine for conducting pilot injection and retarded main injection beyond the exact dead center of compression, pilot injection quantity and timing can be corrected, and the smoke created by the pilot injection can be controlled.

In addition, EGR can be performed by the EGR apparatus 19 and NOx can be suppressed in the low-heat-rate pilot/main injection mode (first injection mode).

Although the present combustion method has the aforementioned merits, the problem of unstable combustion due to reduced combustion flammability arises when the engine operates in a low-load area.

In view of this, the engine of the present embodiment is operated such that fuel injection control is performed by switching from the fuel injection control mode to a regular injection mode (second injection mode) in a low-load area. This is described in detail below.

Figure 7:
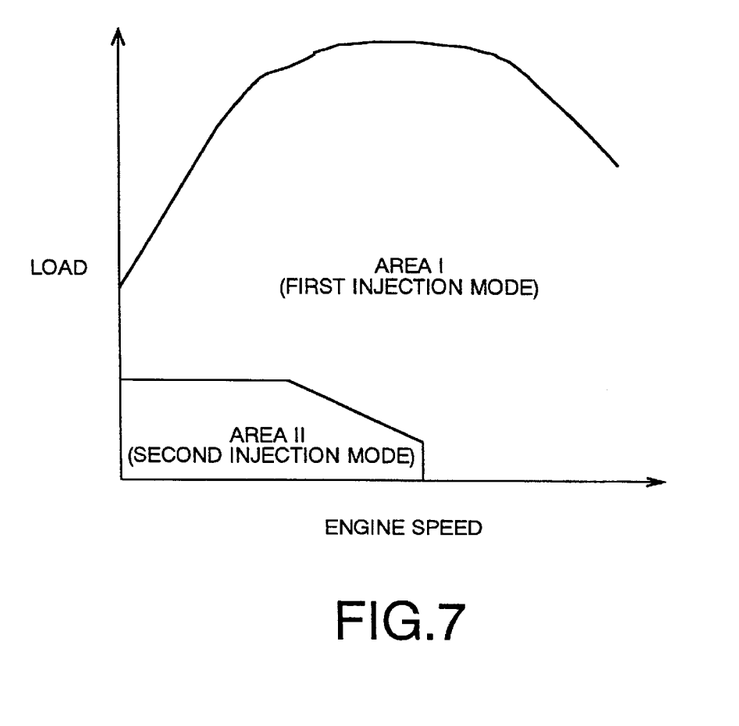
FIG. 7 is a switching map of the fuel injection control modes.

FIG. 7 is a switching map of the fuel injection control modes prerecorded by the ECU 26. The ECU 26 performs fuel injection control by comparing the map with the actual load and number of engine revolutions (engine speed) and selecting either the first injection mode or the second injection mode. As can be seen from the map, fuel injection control is implemented in the second injection mode in area II of low load and low revolutions, and fuel injection control is implemented in the first injection mode in area I of either a high load (which exceeds the low load) or high revolutions. The second injection mode may be set in a uniform manner in a low-load area, but since the problem of reduced fuel ignition does not arise in an area high revolutions even when the load is low, fuel injection control is performed in the first injection mode in an area of low load and high revolutions, making it possible to obtain the benefits of the present combustion method. Furthermore, area I (in which the first injection mode is used throughout the entire operating area) is much wider than area II (in which the second injection mode is used), making it possible to obtain the benefits of the present combustion method in a wide range of operating areas.

Although this can be achieved solely at low revolutions, unstable combustion can thus be controlled because the fuel injection control mode is switched to the second injection mode in the low-load areas.

Modes are thus switched in the simplest possible manner when the actual operating condition surpasses the switching point H. However, this method has disadvantages in that frequent switching is made and hunting occurs when the operating conditions are maintained near the switching point H.

Figure 8:
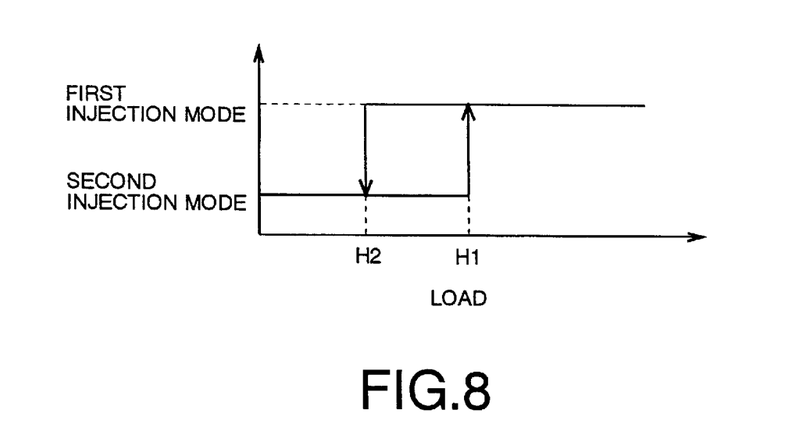
FIG. 8 depicts the hysteresis at the mode switching points.

In order to prevent this, hysteresis is preferably provided to the switching point, as shown in FIG. 8. Specifically, FIG. 8 shows hysteresis in relation to engine load, wherein the value H1 on the high-load side is a switching load from the second injection mode to the first injection mode, and the value H2 on the low-load side is a switching load from the first injection mode to the second injection mode are denoted by. Providing such a system allows hunting to be prevented and control to be stabilized. It is also preferable to provide such a system to switching points based on the number of engine revolutions.

However, this type of mode switching has the following drawback. Specifically, with the first injection mode and second injection mode, a map with different target fuel injection timings and target fuel injection quantities is prepared in advance and recorded by the ECU 26. When a switch is then made, the fuel injection timing and quantity may vary, and in the case of an engine mounted in a vehicle, the shock of switching based on these variations are perceived by the passengers.

It is preferable to implement smoothing control such as that described hereinbelow in order to prevent this shock of switching.

Figure 9:
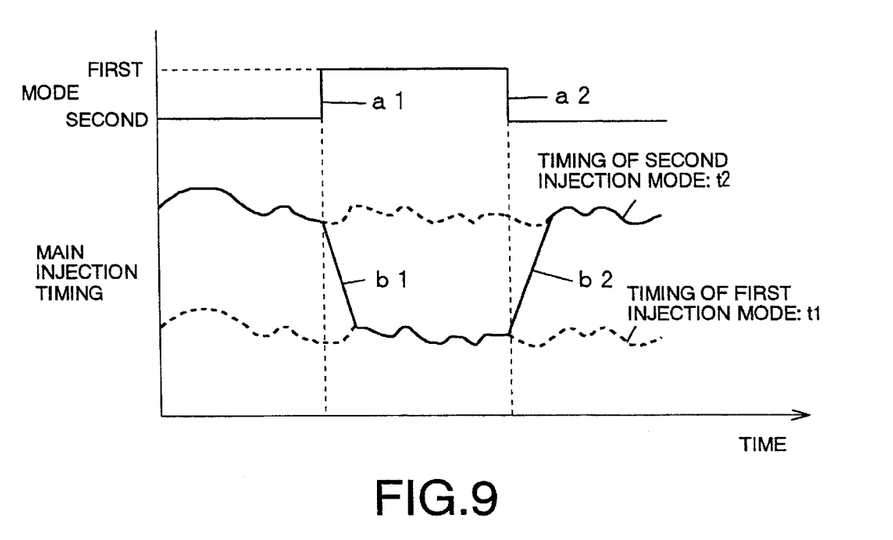
FIG. 9 is a time chart depicting the details of smoothing control.

FIG. 9 depicts the details of smoothing control, with the upper portion depicting the fuel injection control modes, and the lower portion depicting main injection timing. As shown in the lower portion, the main injection timing values (more specifically, the values of target fuel injection timing for main injection) near the mode switching points are different for both modes. The values of the second injection mode are denoted by t2, and the values of the first injection mode are denoted by t1.

When the fuel injection control mode is switched from the second injection mode to the first injection mode on the basis of variations in the engine operating conditions (a1), the main injection timing is not immediately switched from the second injection mode value t2 to the first injection mode value t1, but is gradually switched over from the second injection mode value t2 to the first injection mode value t1 (b1). When a lamp function is set for the transition in the illustrated example, the lamp constant is set to a value within a range in which the switching does not produce any shock.

Next, when the fuel injection control mode is switched (a2) from the first injection mode to the second injection mode on the basis of variations in the engine operating conditions, the main injection timing is not immediately switched from the first injection mode value t1 to the second injection mode value t2, but is gradually switched over from the first injection mode value t1 to the second injection mode value t2 (b2). This transition is performed according to a lamp function in the same manner as above.

Performing such smoothing control allows sudden changes in main injection timing to be prevented together with the shocks of switching between the fuel injection control modes.

The illustrated example depicted main injection timing, but such smoothing control should also be applied as needed to the main injection quantity, pilot injection timing, and pilot injection quantity.

Another feature of the engine of the present embodiment is that a variable vane provided to the turbine 15 of the turbocharger 14 is controlled according to the operating conditions of the engine, an intake throttle valve 23 is controlled according to the operating conditions of the engine, making it possible to control the air intake. The target values of the variable vane opening, intake throttle valve opening, and air intake are prerecorded in the ECU 26 for each fuel injection control mode in a map configuration according to the engine operating conditions, and the target values are determined by comparing the actual engine operating conditions with the map.

In this case, the above-mentioned smoothing control should preferably be implemented when the target values of the variable vane opening, intake throttle valve opening, or air intake vary between the modes during switching between the fuel injection control modes.

In the engine of the present embodiment, damper control is implemented to prevent coupled vibration of the engine and vehicle during comparatively sudden changes in fuel injection quantity.

Figure 10A:
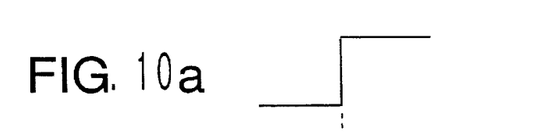
FIGS. 10a–10c are time charts schematically depicting the details of damper control.
Figure 10B:
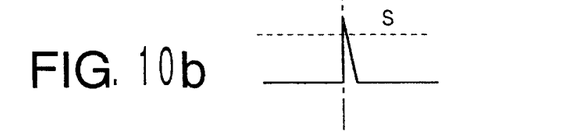
Figure 10C:
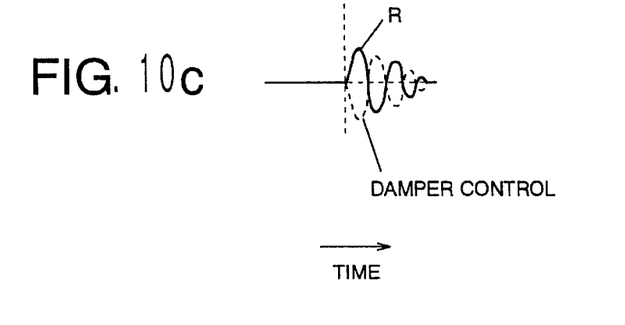

Details of this type of control are schematically depicted in FIGS. 10a–10c. For example, when the driver suddenly presses the accelerator and the actual engine conditions suddenly change, the target fuel injection value Qt suddenly increases, as shown in the drawing. Normally, a fuel injection quantity equivalent to the target fuel injection quantity Qt is actually injected, so the engine torque suddenly increases, and the vehicle rapidly accelerates. However, the engine mount can be regarded as an elastic body, so the engine sometimes vibrates along with the sudden increase in engine torque, and this vibration couples with the vibration of the vehicle to generate a large coupled vibration R in the vehicle, as shown in the diagram. Consequently, damper control automatically controls the fuel injection quantity of the engine, such that vibration in opposite phase of the coupled vibration R (indicated by the dotted line) is supplied to control the coupled vibration R. Damper control is conducted when the differential $\Delta Qt(=dQt/dt)$ of the target fuel injection quantity Qt surpasses the previously set threshold value S.

When operations that involve switching between damper control and fuel injection control modes interfere with each other and are performed simultaneously, the variations in fuel injection quantity induced by damper control and the variations in fuel injection quantity and fuel injection timing induced by mode switching sometimes fail to conform to each other and amplify vehicle vibration. Instances of mode switching may therefore be perceived by the passengers.

In order to prevent this phenomenon, the switching of fuel injection control modes is suspended during interference and resumed following a delay.

Figure 11A:
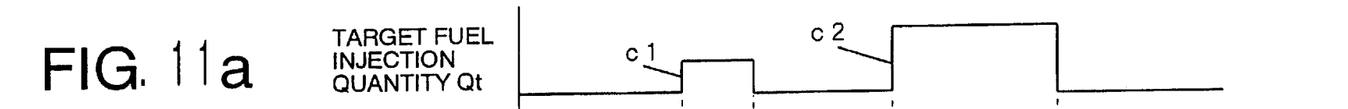
FIGS. 11a–11c are time charts depicting the details of delay control of the mode switching.
Figures 11B, 11C:
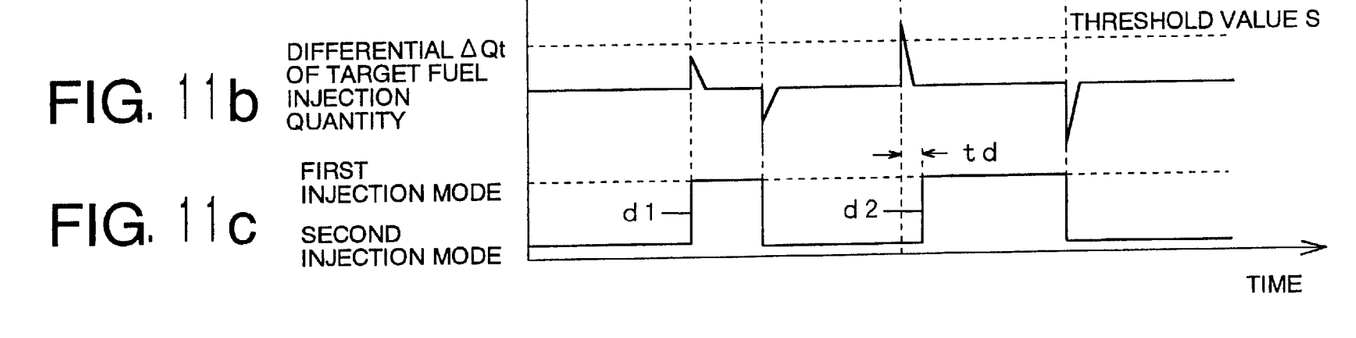

FIGS. 11a–11c depict details of this type of control, where FIG. 11a denotes the target fuel injection quantity Qt, FIG. 11b denotes the differential $\Delta Qt$ $(=dQt/dt)$ of the target fuel injection quantity Qt, and FIG. 11c denotes the fuel injection control modes. Dumper control is implemented only when the differential $\Delta Qt$ exceeds the true threshold value S, and damper control is dispensed with when the differential $\Delta Qt$ is negative. It is optional to implement damper control at the most negative value.

The differential $\Delta Qt$ of the first sudden increase c1 in the target fuel injection quantity Qt does not exceed the true threshold value S, so damper control is dispensed with. Consequently, the current mode is immediately switched in the manner indicated by d1 when the engine operating conditions approach the switching point of the fuel injection control modes.

Meanwhile, the differential $\Delta Qt$ of the next sudden increase c2 in the target fuel injection quantity Qt exceeds the true threshold value S. Damper control is therefore performed. At this point, the modes are not immediately switched in the manner indicated by d2 despite the fact that the engine operating conditions approach the switching point of the fuel injection control modes, and are switched after a specific delay time td following the start of damper control implementation. The delay time td is set, for example, to 0.6 s such that the damper control is either entirely complete or substantially converged.

Thus, vehicle vibration can be prevented from being amplified when the fuel injection control modes are switched during damper control, since switching of the fuel injection control modes is implemented after a specific time has elapsed following the start of damper control.

Implementing the above-mentioned switching control (hysteresis control, smoothing control, and delay control) every time the fuel injection control modes are switched makes it possible to reduce the effect of mode switching on drivability and allows the occurrence of switching shocks or the like to be suppressed. It is thus possible to prevent instances of switching from being noticed by the passengers, to conduct switching while upholding product performance, and to improve exhaust gas characteristics across the entire operating range of an engine. It is also possible to appropriately combine the above-mentioned switching control methods.

Various other configurations can be adopted as embodiments of the present invention. For example, it is also possible to compensate for the switching point H on the switching map in FIG. 7 as the engine warms up. Specifically, the map in question basically determines the conditions after the engine warms up, but when cylinder temperature is low at times such as engine cooling, there is a chance that the heat released by the pilot injection may decrease and combustion may become unstable. The above-mentioned compensation is therefore effective in this case. For example, the switching point H should preferably be compensated (converted) towards higher loads and/or high revolutions at lower water temperatures.

In the present embodiment, a regular injection mode was given as an example of the second injection mode of the present invention, but the second injection mode need not be limited thereto. In short, any of the injection modes for implementing pilot injection and main injection on the basis of conditions that do not fulfill the conditions of the first injection mode can be used as the second injection mode.

To summarize the above, the present invention is highly advantageous in the sense that that low-heat-rate pilot injection allows the smoke in exhaust gas to be controlled when main injection is conducted beyond the top dead center.

To further summarize the above, the present invention is highly advantageous in the sense that unstable combustion in low-load areas can be suppressed when low-heat-rate pilot/main combustion is carried out.

What is claimed is:

1. A compression-ignition internal combustion engine, comprising a fuel injection valve for injecting fuel into a combustion chamber in a cylinder, the fuel injection quantity and the fuel injection timing being controlled based on the engine operating conditions; wherein pilot injection of a comparatively small quantity is carried out through the fuel injection valve prior to the top dead center of compression, and main injection of a comparatively large quantity is then carried out through the fuel injection valve beyond the top dead center of compression; and the fuel injection quantity and fuel injection timing for the pilot injection are set such that the maximum rate of heat release induced by the pilot injection is 60 kJ/s or less.

2. The compression-ignition internal combustion engine according to claim 1, wherein the timing on the most spark-advanced side of the pilot injection corresponds to the time of a crank angle at which the fuel injected through the fuel injection valve moves past the inlet edge of the cavity formed at the top of the piston.

3. The compression-ignition internal combustion engine according to claim 1, wherein the EGR performed by a EGR apparatus is carried out according to the pilot injection and main injection.

4. The compression-ignition internal combustion engine according to claim 1, wherein said compression-ignition internal combustion engine is a common-rail diesel engine.

5. A common-rail diesel engine, comprising a fuel injection valve for injecting fuel into a combustion chamber in a cylinder, a common rail for constantly supplying high-pressure fuel to the fuel injection valve, and control means for controlling the fuel injection valve such that the quantity and timing of the fuel injected through the fuel injection valve are equivalent to the quantity and timing determined in advance based on the operating conditions of the engine; wherein the control means carries out pilot injection of a comparatively small quantity through the fuel injection valve prior to the top dead center of compression and then carries out main injection of a comparatively large quantity through the fuel injection valve beyond the top dead center of compression, and the pilot injection is carried out based on the fuel injection quantity and fuel injection timing such that the maximum rate of heat release induced by the pilot injection is 60 kJ/s or less.

6. A method for controlling a compression-ignition internal combustion engine such that the quantity and timing of the fuel injected through the fuel injection valve into the combustion chamber in the cylinder is controlled based on the operating conditions of the engine; wherein pilot injection of a comparatively small quantity is carried out through the fuel injection valve prior to the top dead center of compression, and main injection of a comparatively large quantity is then carried out through the fuel injection valve beyond the top dead center of compression; and the fuel injection quantity and fuel injection timing in the pilot injection are set such that the maximum rate of heat release induced by the pilot injection is 60 kJ/s or less.

7. A compression-ignition internal combustion engine, comprising a fuel injection valve for injecting fuel into a combustion chamber in a cylinder, the quantity and timing of the fuel injected through the fuel injection valve being controlled based on the engine operating conditions; wherein the compression-ignition internal combustion engine comprises as fuel injection control modes:

a first injection mode in which pilot injection is carried out through the fuel injection valve with a fuel injection quantity and fuel injection timing such that the maximum rate of heat release induced by the pilot injection is 60 kJ/s or less, and main injection is then carried out through the fuel injection valve at a timing beyond the top dead center of compression; and a second injection mode in which pilot injection and main injection are carried out through the fuel injection valve on the basis of conditions that do not fulfill the conditions of the first injection mode; and the fuel injection control modes are switched such that fuel injection control is implemented in the second injection mode in the low-load areas of the engine operating conditions, and fuel injection control is implemented in the first injection mode in the high-load areas of the engine operating conditions.

8. The compression-ignition internal combustion engine according to claim 7, wherein, in a low-load area of the engine, the fuel injection control modes are switched such that fuel injection control is implemented in the second injection mode in a low-speed area of the engine and fuel injection control is implemented in the first injection mode in a high-speed area of the engine.

9. The compression-ignition internal combustion engine according to claim 7, wherein hysteresis is provided to the switch points of the fuel injection control modes.

10. The compression-ignition internal combustion engine according to claim 7, wherein specific smoothing control is implemented when the fuel injection control modes are switched.

11. The compression-ignition internal combustion engine according to claim 7, wherein the compression-ignition internal combustion engine is mounted in a vehicle, damper control is implemented to prevent coupled vibration of the engine and vehicle when the fuel injection quantity changes rapidly, and the fuel injection control modes are switched after a specific time elapses following implementation of the damper control when the fuel injection control modes are switched during implementation of the damper control.

12. The compression-ignition internal combustion engine according to claim 7, wherein the EGR performed by a EGR apparatus is carried out according to the above-mentioned first injection mode.

13. The compression-ignition internal combustion engine according to claim 7, wherein said compression-ignition internal combustion engine is a common-rail diesel engine.

14. A common-rail diesel engine, comprising a fuel injection valve for injecting fuel into a combustion chamber in a cylinder, a common rail for constantly supplying high-pressure fuel to the fuel injection valve, and control means for controlling the injector such that the quantity and timing of the fuel actually injected through the fuel injection valve are equivalent to the target fuel injection quantity and target fuel injection timing determined in advance based on the operating conditions of the engine; wherein the control means comprises, as fuel injection control modes:

a first injection mode in which pilot injection is carried out through the fuel injection valve with a fuel injection quantity and fuel injection timing such that the maximum rate of heat release induced by the pilot injection is 60 kJ/s or less, and main injection is then carried out through the fuel injection valve at a timing beyond the top dead center of compression; and a second injection mode in which pilot injection and main injection are carried out through the fuel injection valve on the basis of conditions that do not fulfill the conditions of the first injection mode; and the fuel injection control modes are switched such that fuel injection control is implemented in the second injection mode in the low-load areas of the engine, and fuel injection control is implemented in the first injection mode in the high-load areas of the engine.

15. A method for controlling a compression-ignition internal combustion engine such that the quantity and timing of the fuel injected through the fuel injection valve into the combustion chamber in the cylinder is controlled based on the operating conditions of the engine; wherein, as fuel injection control modes, are set:

a first injection mode in which pilot injection is carried out through the fuel injection valve with a fuel injection quantity and fuel injection timing such that the maximum rate of heat release induced by the pilot injection is 60 kJ/s or less, and main injection is then carried out through the fuel injection valve at a timing beyond the top dead center of compression; and a second injection mode in which pilot injection and main injection are carried out through the fuel injection valve on the basis of conditions that do not fulfill the conditions of the first injection mode; and the fuel injection control modes are switched such that fuel injection control is implemented in the second injection mode in the low-load areas of the engine, and fuel injection control is implemented in the first injection mode in the high-load areas of the engine.

* * * * *